Feb. 6, 1934.  C. S. BRAGG ET AL  1,946,127
VACUUM BRAKE SYSTEM FOR AUTOMOTIVE VEHICLES
Original Filed June 18, 1929  3 Sheets-Sheet 1

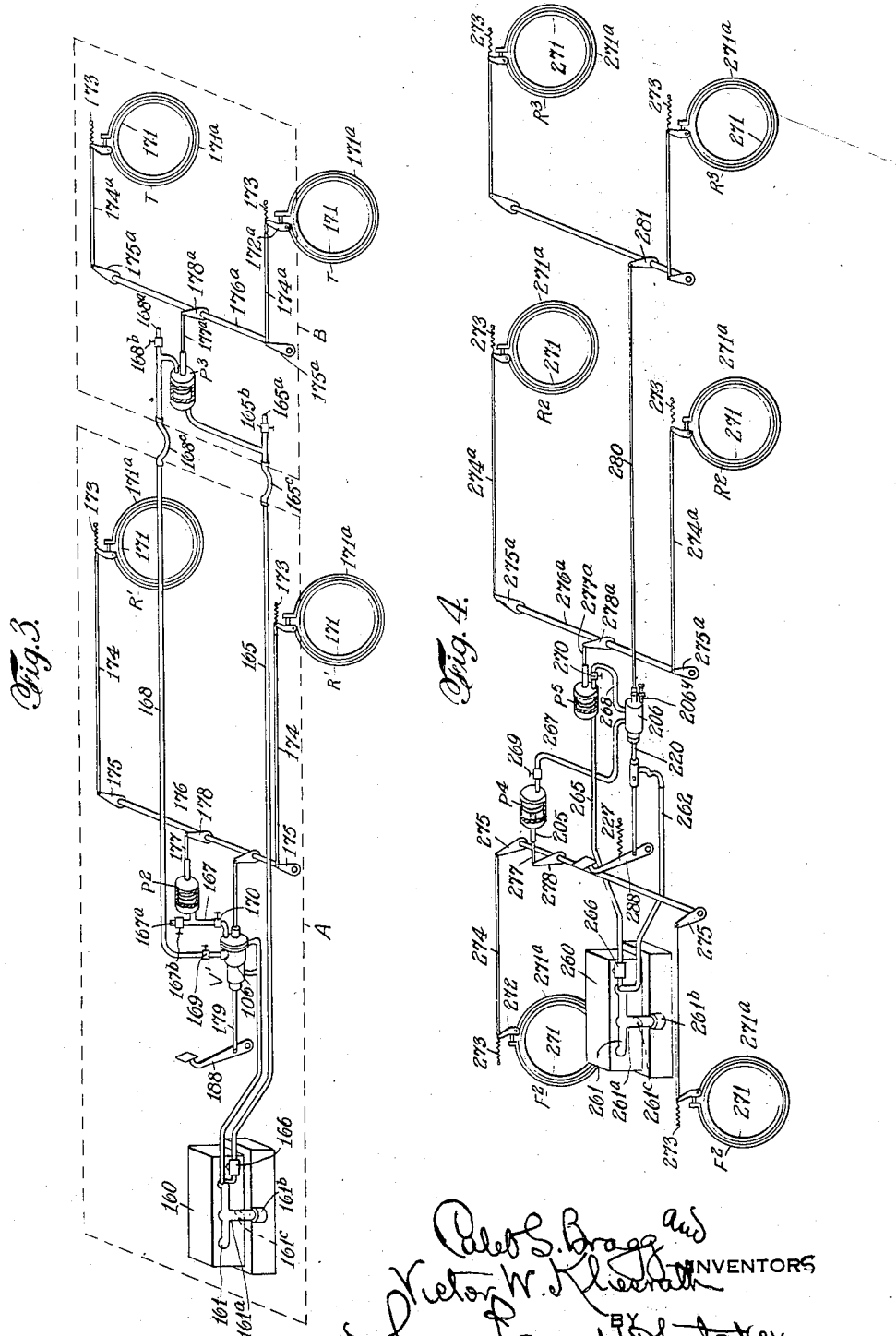

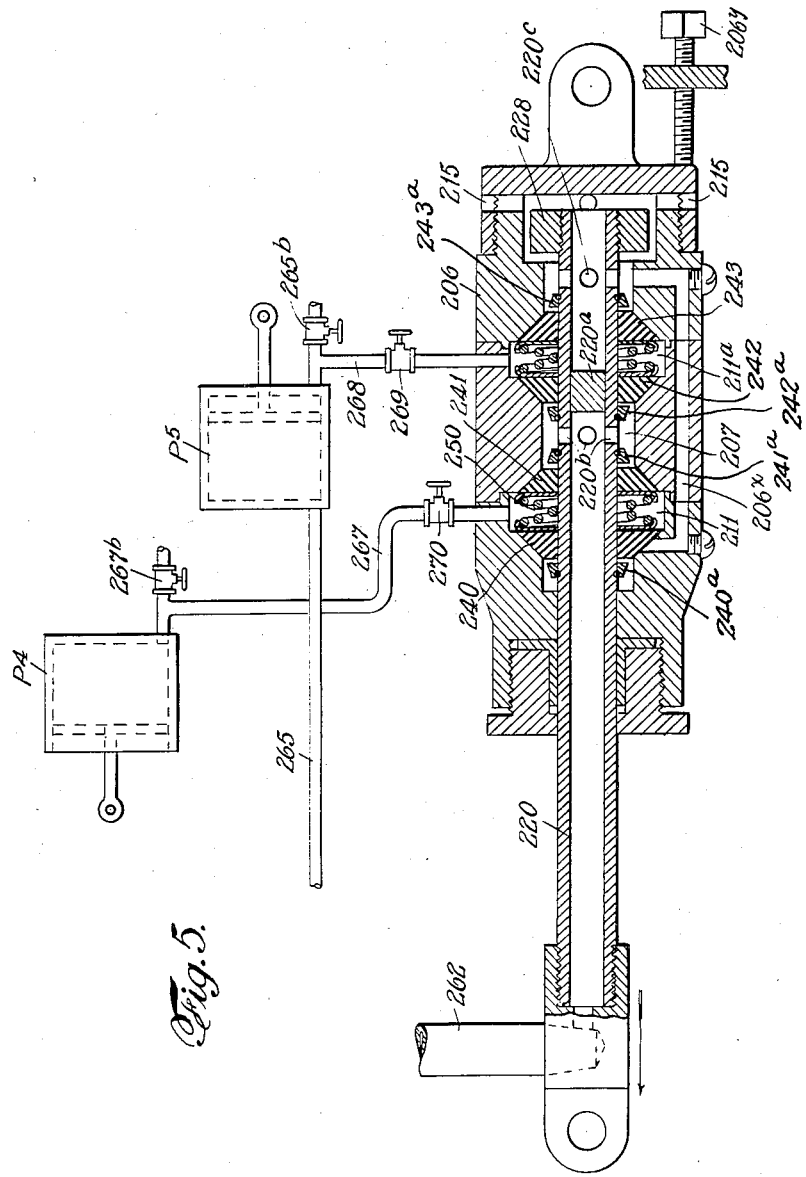

Patented Feb. 6, 1934

1,946,127

UNITED STATES PATENT OFFICE 1,946,127

VACUUM BRAKE SYSTEM FOR AUTOMOTIVE VEHICLES

Caleb S. Bragg, Palm Beach, Fla., and Victor W. Kliesrath, South Bend, Ind., assignors to Bragg-Kliesrath Corporation, Long Island City, N. Y., a corporation of New York Application June 18, 1929, Serial No. 371,763
Renewed July 21, 1933

13 Claims. (Cl. 188—152)

Our invention consists in the novel features hereinafter described, reference being had to the accompanying drawings which illustrate several embodiments of the invention selected by us for purposes of illustration, and the said invention is fully disclosed in the following description and claims.

Our present invention is a vacuum brake system for automotive vehicles in which a partial vacuum is conveniently obtained from the intake manifold of the internal combustion engine which drives the vehicle when the throttle valve is closed, which is the usual position of the throttle valve when braking is desired. In connection with our present invention we employ two different types of power actuators, each comprising a cylinder and piston. In one of these types, which we will call for convenience the "air-balanced" or "pressure-balanced" type, the cylinder is open at one end to the atmosphere and closed at the other, and the piston is normally submerged in air at atmospheric pressure when in the released position. The piston is moved forward to apply the brakes by withdrawing the air from the closed end of the cylinder and is released by admitting air to the closed end of the cylinder. In the other type referred to, which we will term the "vacuum-balanced" type, the cylinder is closed at both ends, and in the released position of the piston both ends of the cylinder are connected with the suction passage, maintaining the piston submerged in vacuum. The piston is moved forward to apply the brakes by admitting air in rear of the piston, without admitting any appreciable quantity of air to the suction passage, and the piston is released by withdrawing the air from the cylinder in rear of the piston.

In installations in which a plurality of actuators of either of these types are employed for operating different brakes of the vehicle or vehicles, a very considerable amount of air would be admitted to the suction passage either during the application of the brakes or during their release, according to the type used, with the result that the engine may stall or its operation may be otherwise interfered with.

Our invention therefore consists of a vacuum brake system comprising a plurality of power actuators for operating brake mechanisms, certain of which actuators have the piston submerged in vacuum, certain other or others of said actuators having the piston or pistons submerged in atmosphere, all of said actuators being under the control of a single valve mechanism, whereby a certain quantity of air will be admitted to the suction passage of the engine during an application of the brakes, and another quantity of air is admitted to the suction passage during the release of the brakes, the amount of air admitted to the suction passage at either time being less than the total amount of air which would be discharged into the suction passage at one time if the power actuators were all of either type. We further provide a physically operable means for the valve mechanism, which is connected by a lost motion connection with brake mechanism of the vehicle, either that normally operated by one or other of the power actuators, or an entirely different brake mechanism, as may be desired.

Our invention also comprises means whereby the brake mechanisms connected with certain of the power actuators may be applied more rapidly than those connected with another actuator or actuators, and in the preferred form of valve mechanism which we employ, means are provided for setting up a resistance to the movement of the valve mechanism in a direction to apply the brakes, which resistance varies substantially in accordance with the differential of fluid pressures acting upon the piston or pistons of one of the types of actuators, to enable the operator to gauge the extent to which the brakes are being applied by power.

In the accompanying drawings which illustrate several embodiments of the invention selected by us for purposes of illustration, Fig. 1 is a diagrammatic view of a vacuum brake system for automotive vehicles embodying our invention.

Fig. 2 is an enlarged sectional view of the controlling valve mechanism shown in Fig. 1.

Fig. 3 is a diagrammatic view of a brake system embodying our invention applied to a tractor and trailer.

Fig. 4 is a view similar to Fig. 3, showing a slightly different form of controlling valve connected in linkage between the pedal and brake mechanisms not connected with any of the actuators.

Fig. 5 is an enlarged sectional view of the valve mechanism shown in Fig. 4.

In the form of our invention illustrated in Fig. 1, we have represented diagrammatically an automotive vehicle operated in the usual manner by an internal combustion engine, indicated at 60, provided with the usual suction passage comprising an intake manifold, 61, and a vertical passage, 61$^a$, connecting the manifold with the carburetor, 61$^b$, and provided with the usual throttle valve, indicated at 61$^c$, between the carburetor and the manifold. In this instance the vehicle is shown as provided with four wheel brakes, F, F, representing the front wheel brakes, and R, R, representing the rear wheel brakes, it being understood that the brake mechanisms may be of any desired type. In this instance each brake mechanism comprises a brake drum, 71, brake band, 71ª, brake applying lever, 72, and retracting springs, 73. The brake levers, 72, of the front wheel brakes are connected by link, 74, with arms, 75, on a cross-shaft 76, while the brake levers, 72, of the rear wheel brakes are connected by links, 74ª, with arms, 75ª, on a cross-shaft, 76ª. In this instance we have shown a power actuator, indicated as a whole at P, of the submerged in atmosphere type, for operating the front wheel brakes, comprising a cylinder, 1, supported rigidly with respect to the chassis in any desired manner, and open to the atmosphere at the end toward the front of the vehicle and closed at the opposite end, and being provided with a piston, 3, having its piston rod, 5, connected by a link, 77, with an arm, 78, on the rock shaft, 76. We have also shown a power actuator, indicated as a whole at P¹, of the submerged in vacuum type, comprising a cylinder, 1ª, closed at both ends and provided with a piston, 3ª, having its piston rod, 5ª, connected by a link, 77ª, with an arm, 78ª, on the rock shaft, 76ª, for operating the rear wheel brakes. The controlling valve mechanism for simultaneously controlling these actuators is indicated as a whole at V, and is shown in an enlarged sectional view in Fig. 2. The valve casing is conveniently made in several sections secured together, for convenience of construction and assembly, the said sections being indicated at 6, 6ª and 6ᵇ respectively. The section, 6, of the valve casing contains a suction chamber, indicated at 7, provided with an aperture, 8, adapted to be connected to the suction passage, and an aperture, 9, surrounded by a valve seat, 10, communicating with a valve chamber, 11, provided with an aperture, 12, adapted to be connected with the cylinder, P¹, in which the cylinder is submerged in vacuum. The section, 6ª, of the valve casing forms one wall of the valve casing, and is provided opposite to the valve seat, 10, with a coaxial aperture, 13, surrounded by an oppositely disposed valve seat, 14. The section, 6ª, of the casing is also provided with a plurality of apertures, indicated at 15 communicating at their outer ends with the atmosphere. The section, 6ᵇ, of the casing is bolted or otherwise secured to the section, 6ª, in such a manner as to clamp between said sections a flexible diaphragm, 23, which divides the space between the sections, 6ª and 6ᵇ, of the valve casing into separate chambers. The section, 6ᵇ, of the valve chamber is provided with an annular valve seat, 16, which engages the diaphragm when the valve mechanism is in released position, and further divides the space within the section, 6ᵇ, into an annular suction chamber, 17, provided with an aperture, 18, adapted to be connected with a suction passage, and a central chamber, 17ª, provided with an aperture, 19, which is adapted to be connected with the closed end of the cylinder, 1, of the actuator, P. Extending longitudinally through the valve casing is a valve actuating part or stem, 20, which passes through a stuffing box, 21, at the forward end of the casing section, 6, and has a reduced portion, 22, in guiding engagement with a recess in the valve actuating casing section, 6ᵇ. The portion of the valve actuating part within the casing section 6ª, and has a reduced portion, 22, in guiding engagement with a recess in the casing section, 6ᵇ. The portion of the valve actuating part within the casing sections, 6ª and 6ᵇ, passes through a central aperture in the diaphragm, 23, and also through a central aperture in a disc valve, 25, the valve and diaphragm being clamped sealingly in relation to the valve actuating part in any usual or desired manner. The disc valve is provided with an annular seat, 26, for engaging the diaphragm when the stem, 20, is drawn forward (to the left in Fig. 2), and the disc valve is normally held in unseated position, as shown in Fig. 2, when the parts are in released position. The diaphragm, 23, is also provided with air inlet apertures, indicated at 24, which are closed by the disc valve when in seated position. We also prefer to provide a leaf spring or spider, indicated at 27, for normally returning and holding the valve mechanism in the released position shown in Fig. 2, and for furnishing an initial resistance to the movement of the valve actuating stem, 20, said spring being in this instance clamped between the diaphragm and a stop collar, 28, on the stem, 20, and having fingers engaging the inner face of the casing section, 6ª, but we do not limit ourselves to this construction. The stop collar, 28, is of larger diameter than the aperture, 13, in the casing section, 6ª, so that it will engage the casing section and form a stop for limiting the amount of lost motion between the valve actuating stem, 20, and the valve casing.

Within the valve chamber, 11, in the casing section, 6, we provide a pair of oppositely disposed valves, 40 and 41, for engaging the valve seats, 10 and 14 respectively. These valves are conveniently formed of compressed rubber, cord, or cork composition, or other suitable material in annular form, and sealingly engage a cylindrical portion, 20ª, of the stem, 20, and are movable with respect to said stem. The valve stem is provided with collars, 40ª and 41ª, for unseating the valves, which are normally pressed toward their seats by an intervening spring, 50, sufficiently strong to seat valve, 41, against maximum differentials of pressure, and the said collars are so arranged that when the parts are in released position, as shown in Fig. 2, the collar, 40ª, holds the valve, 40, which is a suction valve, unseated as shown, while the collar, 41ª, is slightly removed from the valve, 41, which is held in seated position by the spring, 50. The collars, 40ª and 41ª, are so spaced with relation to the valves, 40 and 41, that both of these valves are seated when the valve, 26, is seated on the diaphragm and the diaphragm seated on the valve seat, 16, and there is sufficient movement of the diaphragm, 23, and the valve, 26, to permit full opening of the valves, 40 and 41.

The controlling valve mechanism illustrated in Fig. 2 is installed in and supported by the linkage between the physically operable part, to wit, the pedal lever, 88, and certain brake mechanisms of the vehicle. In this instance the valve actuating part or stem, 20, is connected by a link, 79, with the pedal lever, and the valve casing is connected by a link, 80, with an arm, 81, on the rock shaft, 76ª, in the installation illustrated in Fig. 1 for example. The pipe connections to the actuators and controlling valve mechanism are as follows. A suction pipe, 62, having a flexible portion, extends from the suction passage of the engine, in this instance from the intake manifold to the valve mechanism, and is connected by branch pipes, 63 and 64 respectively, with the aperture, 8, in the valve section, 6, and with the aperture, 18, in the valve section, 6ᵇ. A second suction pipe, 65, extends from the intake manifold to the forward end of the cylinder, 1ᵃ, of the actuator, P¹. The suction pipe, 65, is preferably provided with a check valve opening toward the manifold, as indicated at 66. The aperture, 19, in section, 6ᵇ, of the valve mechanism is connected by a service pipe, 67, having a flexible portion, with the closed end of cylinder, 1, of the power actuator, P. The aperture, 12, in the casing section, 6, of the valve mechanism is connected by a service pipe, 68, having a flexible portion, with the closed end of cylinder, 1ᵃ, of the actuator, P¹, in rear of the piston, and said service pipe may be provided with a restricting valve, indicated at 69, if desired. A similar restricting valve, indicated at 70, may be inserted in the service pipe, 67, if desired.

When the engine is running and the brake mechanism is in released position, the parts of the controlling valve mechanism being in the positions indicated in Fig. 2, it will be seen that the forward end of the cylinder, 1ᵃ, of the power actuator, P¹, will be exhausted through the suction pipe, 65, and the portion of cylinder, 1ᵃ, in rear of the piston will likewise be exhausted through the service pipe, 68, (suction valve, 40, being held open as shown), suction chamber, 7, branch pipe, 63, and the suction pipe, 62, so that the piston, 3ᵃ, of the actuator, P¹, is maintained submerged in vacuum. As the diaphragm, 23, is seated on the annular seat, 16, the suction in branch, 64, will not extend beyond the annular suction chamber, 17, and the service pipe, 67, will connect the closed end of cylinder, 1ᵃ, of the actuator, P, with the atmosphere through the apertures, 24, in the diaphragm, as the disc valve, 25, is unseated. The piston, 3, of the power actuator, P, will therefore be maintained submerged in air at atmospheric pressure.

To apply the brakes the operator will place his foot on the pedal lever and depress it, overcoming the initial resistance of the spring, 27, and shifting the valve actuating part or stem, 20, in the direction of the arrow in Fig. 2. This movement seats the disc valve, 25, on the diaphragm, cutting off communication between the atmosphere and the air-balanced cylinder, 1, thereafter unseating the diaphragm, 23, from seat, 16, and connecting the closed end of cylinder, 1, with suction, so as to effect a power stroke of the piston, 3, and simultaneously the suction valve, 40, is permitted to close under the action of its spring, cutting off the rear end of the suction-balanced cylinder from suction, and thereafter valve, 41, is opened by collar, 41ᵃ, which admits air through the inlet apertures, 15, and air inlet valve aperture, 13, to the valve chamber, 11, and thus to the rear end of the cylinder, 1ᵃ, which effects a power stroke of the piston, 3ᵃ, therein, substantially simultaneously with the power stroke of the piston, 3, but without admitting any material quantity of air to the suction passage as the forward end of cylinder, 1ᵃ, is already exhausted. It follows, therefore, that the operation of the valve mechanism effects a power stroke in all the cylinders connected therewith, but that air will only be withdrawn from the air-balanced cylinder or cylinders.

The valve mechanism shown in Fig. 2 provides a fluid pressure reaction upon the diaphragm, 23, which is transmitted through the valve actuating part and link, 79, to the pedal, which will increase proportionately to the decrease of pressure in the cylinder, 1, of actuator, P, and which must be overcome by the operator in order to continue the power stroke of the piston of the several actuators. It will be seen that the one face of the diaphragm, 23, is at all times subjected to atmospheric pressure through the apertures, 15, and when the disc valve, 25, is seated and has unseated the diaphragm, the pressure will be greatly reduced on the opposite face of the diaphragm and disc valve, as the cylinder, 1, is exhausted, producing a gradual increasing differential of fluid pressures. This differential of fluid pressures acts in a direction reverse to that indicated by the arrow in Fig. 2, and adds to the resistance of the spring, 27, a gradual increasing resistance, which is felt by the foot of the operator and enables him to gauge the extent to which the actuators are exerting power on the brakes. While this differential of fluid pressures is produced by the exhaustion only of the air-balanced actuator or actuators, it will serve as a substantial index to the operator as to the power which is being applied by all of the actuators to the brakes connected therewith.

The valve mechanism provides what is termed a "follow-up" function, in that the entire valve mechanism moves forward with the pedal, and when the forward movement of the pedal is stopped at any intermediate point in its stroke, the valve casing will continue to move forward in the direction of the arrow in Fig. 2, by reason of its connection with the piston of the actuator through the arm, 81, on the rock shaft, 76ᵃ, so as to permit the seating of the air inlet valve, 41, and the diaphragm, 23, without opening the suction valve, 40, or unseating the disc valve, 25, which will arrest the movement of the pistons and hold the brakes as applied until they are either further applied by another forward movement of the pedal or released by a rearward movement of the pedal, which will permit the valves to return to the released position under the action of the retracting spring, 27, or by the differential of fluid pressures on the diaphragm, 23. When the pedal is so released, the suction valve, 40, will open and connect the rear end of cylinder, 1ᵃ, with suction, and the disc valve, 25, will be simultaneously unseated and connect the closed end of cylinder, 1, with the atmosphere, permitting pressures to be again equalized in the power actuators, and the brakes will be released and returned to the off position by their retracting means, as springs, 73. During the release of the brakes, air will be exhausted only from the vacuum-balanced cylinder or cylinders.

It follows, therefore, that in the brake system herein described, a plurality of power actuators are simultaneously controlled by a single valve mechanism to apply and release the brakes, and that at no time is air withdrawn into the suction passage from all the cylinders of the actuators. As before stated, during the power stroke air will be withdrawn only from the air-balanced cylinder or cylinders, and during the release of the brakes air will be withdrawn only from the vacuum-balanced cylinder or cylinders. This enables us to employ a plurality of power actuators without material danger of stalling the engine or interfering with the operation thereof. It will be obvious that this single valve mechanism may control more than one of each type of power actuator if this is necessary or desirable, and in Fig. 1 for example we have shown the service pipes, 67 and 68, and the suction pipe, 65, provided with branch pipes, 67ᵃ, 68ᵃ and 65ᵃ, provided in this instance with cut-off cocks, 67ᵇ, 68ᵇ and 65ᵇ respectively, for connecting up an additional power actuator or actuators of each type with the controlling valve mechanism. It will also be understood that by suitably regulating the period of time required for the accumulation of a predetermined fluid pressure in the several power actuators to effect the power stroke thereof, the brakes connected with certain actuator or actuators may be applied with a predetermined amount of force before others. This may be accomplished in several ways, for example by making the cylinders of different sizes, or as shown in Fig. 1 for example, in which the cylinders are of the same size, by providing a restricting valve or valves, as 69 and 70, in the service pipes, 68 and 67, to regulate the time required to build up a predetermined pressure in either cylinder, or the same result could be accomplished by varying the sizes of the service pipes. For example in Figs. 1 and 2, we have shown the aperture, 12, connected with the service pipe, 68, and said service pipe of greater diameter than the aperture, 19, and the service pipe, 67, connected therewith, so that pressure will accumulate more rapidly in the cylinder, 1ᵃ, in rear of the piston, 3ᵃ, and apply the rear wheel brakes more rapidly than the front wheel brakes, in which case the restricting valve, 68, may be omitted if desired. By restricting one of the service pipes, or by restricting both of them to different extents, in the installation shown in Fig. 1 for example, the rear wheel brakes may be applied initially with greater pressure than the front wheel brakes, or vice versa, depending upon the cylinder in which the pressure accumulates more rapidly. Obviously, when the pedal reaches its limit of movement beyond which it cannot be overtaken by the further forward movement of the valve casing, the maximum pressure would accumulate in both cylinders.

It will also be understood that in the construction illustrated in Fig. 1 for example, the operator can take up the lost motion between the valve actuating stem, 20, and the valve casing and apply his physical force to the brake mechanisms with which the pedal is connected, in this instance the rear wheel brake mechanisms, in addition to the power of the actuator, P¹, and in like manner said brake mechanisms may be operated by physical force alone in case of failure of power.

It will be noted that as the operative movement of the controlling valve mechanism operates simultaneously all of the power actuators, there is only one lost motion connection to be taken up and this can be reduced to the minimum necessary to secure the full opening of the valves. This is important, as the lost motion is multiplied by the pedal leverage which normally varies from a four to one to a six to one leverage. As the range of movement of the pedal is limited because only a small amount of movement of the operator's foot and leg beneath the steering wheel is possible with reasonable comfort in driving, any considerable amount of lost motion would be likely to result in either, causing the pedal to strike the floor boards, with the slightest wear of the brake linings or expansion of brakes by heat before reaching the limits of its efficient action, or an undesirable reduction in pedal leverage would have to be made.

Our improved brake system is advantageous also in connection with tractor and trailing vehicles, in which case the brakes of the tractor and of the trailer or trailers can be simultaneously applied and released in the manner previously described. In Fig. 3 for example, we have illustrated diagrammatically an installation suitable for a tractor vehicle and a trailer, in which the parts corresponding with those previously described are given the same reference numerals with the addition of 100. In this instance an air-balanced power actuator, indicated at P², has its piston connected with brake mechanisms, R¹, R¹, for the rear wheels of the tractor vehicle, indicated in dotted lines at A, and a vacuum-balanced power actuator, indicated at P³, is located on the trailer, indicated in dotted lines at B, and connected with brake mechanisms, T, T, thereof, the suction pipe, 165, and service pipe, 168, being provided with the usual flexible portions, 165ᶜ and 168ᶜ, between the vehicles to accommodate the relative movement thereof. In this instance we have shown the service pipe, 167, for the actuator, P², provided with a restricting valve, 170, so that while the power actuators will be simultaneously operated under the control of the valve mechanism, indicated at V¹, as before described, said restricting valve may be so adjusted as to retard the exhaustion of the cylinder of actuator, P², and permit pressure to accumulate more rapidly in the cylinder of actuator, P³, in rear of the piston, with the result that the trailer brakes will be applied before the tractor brakes and will be applied with greater power than the tractor brakes up to the nearly maximum throw of the pedal, thus precluding the possibility of the trailer overrunning the tractor. In Fig. 3 the valve mechanism, V¹, is inserted in and supported by linkage connecting the pedal lever with the brake mechanisms, R¹, R¹, of the tractor, to which the physical force of the operator can be applied in addition to that of the power actuator, P², or the tractor brakes may be applied by physical force alone in case of failure of power. It is to be understood that an additional power actuator or actuators may be employed on either the tractor or trailer if desired, and we have shown the service pipes, 167 and 168, and the suction pipe, 165, provided with valve extensions for this purpose.

In Fig. 4 we have illustrated an installation similar to that shown in Fig. 1, in which the corresponding parts are given the same reference numerals with the addition of 200, except that in this instance the controlling valve mechanism is of different construction, as specifically illustrated in Fig. 5, and is inserted in linkage between the pedal lever and brake mechanism not connected with any of the actuators. In this instance there will be no "follow-up" movement of the valve casing, and the stopping of the power strokes of the pistons before reaching their limits of movement will be effected by partial release of pressure on the pedal, and there will be no differential of fluid pressures reacting upon the pedal, but the parts will otherwise operate as previously described. Referring to Fig. 5, the valve casing, 206, is provided with a centrally located suction chamber, 207, communicating on opposite sides with valve chambers, 211 and 211ᵃ, each provided with oppositely disposed valve seats. A valve actuating part in the form of a hollow sleeve, 220, extends through the valve casing and carries a pair of oppositely disposed valves in each of the valve chambers, constructed and operating substantially like the valves, 40 and 41, previously described, and normally held seated by intermediate springs, 250. These valves are indicated at 240, 241, 242 and 243, the valves, 241 and 242, being suction valves, and the valves, 240 and 243, being air inlet valves. The valves are movable with and with respect to the sleeve, 220, and are unseated by means of collars, indicated at 240$^a$, 241$^a$, 242$^a$ and 243$^a$, so located that in the released position of the parts shown in Fig. 5 all of these valves may remain seated. A limited amount of lost motion between the valve sleeve, 220, and the valve casing is permitted by a collar, 228, located in a recess in the valve casing; which permits a sliding movement of the sleeve in either direction before coming in contact with the transverse walls of the recess. The valve actuating sleeve is provided with an interior plug, indicated at 220$^a$, located adjacent to the rear end of the suction chamber, 207, and the sleeve is provided with apertures, 220$^b$, communicating with the suction chamber, while the portion of the sleeve in rear of the air inlet valve, 243, is in communication with the atmosphere through casing apertures, 215, and apertures, 220$^c$, in the sleeve, 220. A by-pass, 206$^x$, connects the seat of the air inlet valve, 240, with the portion of the valve casing in communication with the atmosphere. The valve sleeve, 220, is connected with the pedal lever, and the valve casing is connected in this instance with brake mechanisms, R$^3$, R$^3$, for additional rear wheels of the vehicle, which in this instance are not connected with any of the power actuators.

As shown in the diagram Fig. 4, an air-balanced power actuator, P$^4$, is connected with the front wheel brake mechanisms, F$^2$, F$^2$, in the same manner as indicated in Fig. 1, and a vacuum-balanced power actuator, P$^5$, is connected with the rear wheel brake mechanisms, R$^2$, R$^2$, in the same manner as indicated in Fig. 1. The suction pipe, 262, is connected in this instance with the interior of the valve actuating sleeve, 220, and is provided with a flexible portion. The suction pipe, 265, is connected to the cylinder of the vacuum-balanced actuator, P$^5$, in the same manner as illustrated in Fig. 1. The service pipe, 267, connects the valve chamber, 211, with the closed end of the cylinder of the power actuator, P$^4$, and the service pipe, 268, connects the valve chamber, 211$^a$, with the cylinder of power actuator, P$^5$, in rear of the piston. Either one or both of the service pipes may be provided with a restricting valve, and in this instance we have shown each of the service pipes connected with a restricting valve or valves, which are indicated at 269 and 270. In the installation shown in Fig. 4, in which this valve mechanism of Fig. 5 is used, the pedal lever is preferably provided with a retracting spring, indicated at 227, and with a stationary stop, 206$^y$, carried by a part in fixed relation with the chassis, which may be conveniently employed to arrest the valve casing and pedal in their released positions. When the operator depresses the pedal, assuming that the engine is running, the forward movement of the valve actuating sleeve, 220, in the direction of the arrow Fig. 5. with respect to the valve casing, 206, will effect the simultaneous opening of the valve, 241 and the valve, 243. The opening of valve, 241, will connect the closed end of cylinder of actuator, P$^4$, with the suction chamber. 207, and the opening of valve, 243, will connect the cylinder of actuator, P$^5$, in rear of the piston with atmosphere, so that both actuators will start to effect the power stroke which can be arrested by the operator relieving the pedal sufficiently to permit the valves, 241 and 243, to again close. The brake mechanisms connected with either of the power actuators can be caused to take effect first, by suitable adjustment of the restricting valve or valves in the same manner as previously described. When the brakes have been fully applied by the actuators, the operator can take up the lost motion between the valve actuating sleeve, 220, and the valve casing and apply his physical force to the additional brake mechanisms, R$^3$, R$^3$, and can also apply the brake mechanisms, R$^3$, R$^3$, by physical force alone in case of failure of power. The valve mechanism shown in Fig. 5 may also be interposed between the pedal lever and the brake mechanisms, R$^2$, R$^2$, as disclosed in Figure 4 connecting the link, 280, with an arm 278$^b$ on the rock shaft, 276$^a$, and in such case the "follow-up" effect of the valve would be exactly as that previously described with reference to Figs. 1 and 2. When the brakes are fully applied, if the operator releases his foot the retracting spring will effect the opening of valves, 240 and 242, after the closing of the valves, 241 and 243, thus connecting the cylinder of actuator, P$^4$, with the atmosphere by way of by-pass, 206$^x$, and connecting the cylinder of actuator, P, with suction, to withdraw the air previously admitted. The valve shown in Fig. 5 will also control a plurality of actuators of each type if this is desired, and we have therefore shown the suction pipe, 265, and the service pipes, 267 and 268, provided with branch pipes having cut-off valves in the same manner as in Fig. 1.

It will be obvious that by disconnecting one or other of the power actuators from the controlling valve mechanism, as by closing either of the restricting valves, as 69 and 70, illustrated in Fig. 1, or 169 and 170 illustrated in Fig. 3, or 269 and 270 illustrated in Fig. 4 for example, the valve mechanism may be used to control only the actuator (or actuators) which remain connected therewith. This is especially desirable where one of the brake mechanisms is located on a trailing vehicle, as indicated in Fig. 3, which may at times be disconnected from the tractor vehicle, at which time the restricting valve, 169, can be closed entirely.

What we claim and desire to secure by Letters Patent is:—

1. In a vacuum brake system for automotive vehicles provided with an internal combustion engine having a throttle controlled suction passage, the combination with a plurality of power actuators, each comprising a cylinder and a piston therein provided with means for connecting it with brake mechanism, certain of said actuators having the piston submerged in vacuum, and certain of said actuators having the piston submerged in a higher pressure fluid, when in the released position, a controlling valve mechanism connected with all of said cylinders and with said suction passage and with the higher fluid pressure source, and a physically operable part for operating said valve mechanism to substantially simultaneously effect a power stroke of the pistons of all of said actuators.

2. In a vacuum brake system for automotive vehicles provided with an internal combustion engine having a throttle controlled suction passage, the combination with a plurality of power actuators, each comprising a cylinder and a piston therein provided with means for connecting it with brake mechanism, certain of said actuators having the piston submerged in vacuum, and certain of said actuators having the piston submerged in a higher pressure fluid, when in the released position, a controlling valve mechanism connected with all of said cylinders and with said suction passage and with the higher fluid pressure source, and a physically operable part for operating said valve mechanism to substantially simultaneously effect a power stroke of the pistons of all of said actuators, and restricting means in the connections between said valve mechanism and certain of said cylinders.

3. In a vacuum brake system for automotive vehicles provided with an internal combustion engine having a throttle controlled suction passage, the combination with a plurality of power actuators, each comprising a cylinder and a piston therein provided with means for connecting it with brake mechanism, certain of said actuators having the piston submerged in vacuum, and certain of said actuators having the piston submerged in a higher pressure fluid, when in the released position, a controlling valve mechanism connected with all of said cylinders and with said suction passage and with the higher fluid pressure source, and a physically operable part for operating said valve mechanism to substantially simultaneously effect a power stroke of the pistons of all of said actuators, and independently operable restricting means in the respective connections between said valve mechanism and the actuator cylinders.

4. In a vacuum brake system for automotive vehicles provided with an internal combustion engine having a throttle controlled suction passage, the combination with a plurality of power actuators, each comprising a cylinder and a piston therein provided with means for connecting it with brake mechanism, certain of said actuators having the piston submerged in vacuum, and certain of said actuators having the piston submerged in a higher pressure fluid, when in the released position, a controlling valve mechanism connected with all of said cylinders and with said suction passage and with the higher fluid pressure source, and a physically operable part for operating said valve mechanism to substantially simultaneously effect a power stroke of the pistons of all of said actuators, said physically operable part being connected by means providing lost motion with brake mechanisms for the vehicle.

5. In a vacuum brake system for automotive vehicles provided with an internal combustion engine having a throttle controlled suction passage, the combination with a plurality of power actuators, each comprising a cylinder and a piston therein provided with means for connecting it with brake mechanism, certain of said actuators having the piston submerged in vacuum, and certain of said actuators having the piston submerged in a higher pressure fluid, when in the released position, a controlling valve mechanism connected with all of said cylinders and with said suction passage and with the higher fluid pressure source, and a physically operable part for operating said valve mechanism to substantially simultaneously effect a power stroke of the pistons of all of said actuators, said physically operable part being connected by means providing lost motion with certain brake mechanisms operatively connected with certain of said actuator pistons.

6. In a vacuum brake system for automotive vehicles provided with an internal combustion engine having a throttle controlled suction passage and further provided with a plurality of brake mechanisms, the combination with a plurality of power actuators, each comprising a cylinder and a piston therein provided with means for connecting it with certain of said brake mechanisms, certain of said actuators having the piston submerged in vacuum, and certain of said actuators having the piston submerged in a higher pressure fluid, when in the released position, a controlling valve mechanism connected with all of said cylinders and with said suction passage and with the higher fluid pressure source, and a physically operable part for operating said valve mechanism to substantially simultaneously effect a power stroke of the pistons of all of said actuators, said valve mechanism comprising relatively movable parts connected respectively with the physically operable part and with certain of the first mentioned brake mechanisms for the vehicle, and being provided with a part connected with the physically operable part and having its opposite faces subjected to a differential of fluid pressures in a direction to oppose the movement of the physically operable part when the latter is moved to effect the application of the brakes.

7. In a vacuum brake system for automotive vehicles provided with an internal combustion engine having a throttle controlled suction passage and further provided with a plurality of brake mechanisms, the combination with a plurality of power actuators, each comprising a cylinder and a piston therein provided with means for connecting it with certain of said brake mechanisms, certain of said actuators having the piston submerged in vacuum, and certain of said actuators having the piston submerged in a higher pressure fluid, when in the released position, a controlling valve mechanism connected with all of said cylinders and with said suction passage and with the higher fluid pressure source, and a physically operable part for operating said valve mechanism to substantially simultaneously effect a power stroke of the pistons of all of said actuators, said valve mechanism comprising relatively movable parts connected respectively with the physically operable part and with certain of the first mentioned brake mechanisms for the vehicle, and being provided with a part connected with the physically operable part and having its opposite faces subjected to a differential of fluid pressures acting upon certain of said pistons only, and exerted in a direction to oppose the movement of the physically operable part when said part is moved in a direction to apply the brakes.

8. In a vacuum brake system for automotive vehicles provided with an internal combustion engine having a throttle controlled suction passage, the combination with a plurality of power actuators, each comprising a cylinder and a piston therein provided with means for connecting it with brake mechanisms, one of said actuators being pressure-balanced, and another of said actuators being vacuum-balanced, when in the released position, a single controlling valve mechanism connected with one end of each of said cylinders, and provided with means for normally connecting the pressure-balanced cylinder with the atmosphere and the vacuum-balanced cylinder with said suction passage and for substantially simultaneously reversing said connections, and a physically operable part for said valve mechanism.

9. In a vacuum brake system for automotive vehicles provided with an internal combustion engine having a throttle controlled suction passage, the combination with a plurality of power actuators, each comprising a cylinder and a piston therein provided with means for connecting it with brake mechanisms, one of said actuators being pressure-balanced, and another of said actuators being vacuum-balanced, when in the released position, a single controlling valve mechanism connected with one end of each of said cylinders, and provided with means for normally connecting the pressure-balanced cylinder with the atmosphere and the vacuum-balanced cylinder with said suction passage and for simultaneously reversing said connections, and a physically operable part for said valve mechanism, said valve mechanism being constructed to substantially simultaneously disconnect both cylinders from the suction passage and the atmosphere, and being located in linkage between said physically operable part and a part connected with one of said pistons and the brake mechanisms connected therewith.

10. In a vacuum brake system for automotive vehicles provided with an internal combustion engine having a throttle controlled suction passage, the combination with a plurality of power actuators, each comprising a cylinder and a piston therein provided with means for connecting it with brake mechanism, one of said actuators being vacuum-balanced, and the other of said actuators being pressure-balanced when in the released position, a physically operable control part for said system, a single controlling valve mechanism connected with one end of each of said cylinders, provided with means for normally connecting the pressure-balanced cylinder with said suction passage and for simultaneously reversing said connections to apply the brake mechanism, and to simultaneously disconnect both cylinders from the suction passage and the atmosphere when said valve mechanism is in an intermediate position, and being located in linkage between said physically operable control part and a part connected with one of said pistons and the brake mechanism connected therewith, said physically operable control part being connected by means providing a lost motion with said last mentioned brake mechanism.

11. In a vacuum brake system for automotive vehicles having an internal combustion engine provided with a throttle controlled suction passage, the combination with a vacuum-balanced power actuator comprising a cylinder closed at both ends, and a piston in said cylinder provided with means for connecting it with brake mechanism, said cylinder forward of the piston being connected at all times with the suction passage, a pressure-balanced power actuator comprising a cylinder closed at one end and communicating with the atmosphere at the other end, and a piston in said cylinder provided with means for connecting it with brake mechanism, of a single controlling valve mechanism for said actuators, comprising a valve casing having a valve chamber connected with the vacuum-balanced actuator cylinder in rear of the piston and provided with a suction aperture communicating with said suction passage, and an air inlet aperture communicating with the atmosphere, a valve actuating part extending through the valve casing, suction and air inlet valves for said aperture operatively connected with said part, said suction valve being normally maintained open, said valve casing being provided with a second valve chamber connected with the closed end of said pressure-balanced cylinder and provided with means for connecting it with the atmosphere and with the suction passage, valve means in said second chamber connecting said chamber with the atmosphere and operatively connected with said valve actuating part, and constructed to close said atmospheric connection and open the suction connection, and an operator operated part connected with the valve actuating part.

12. In a vacuum brake system for automative vehicles provided with an internal combustion engine having a throttle controlled suction passage, the combination with a vacuum-balanced power actuator and a pressure-balanced power actuator, of a single controlling valve mechanism for both actuators, comprising a valve casing having a valve chamber connected with one end of the vacuum-balanced actuator, and ports communicating with the said suction passage and with the atmosphere, a valve actuating part extending through the valve casing, a normally opened suction valve for said suction port and a normally closed air inlet valve for said inlet port, said valve casing being provided with a second valve chamber, a diaphragm dividing said chamber and provided with air inlet apertures, said second valve chamber having an annular valve seat for engaging said diaphragm and being connected on one side of said seat with the pressure-balanced actuator and on the other side of said seat with said suction passage, a disc valve for closing the air inlet apertures in the diaphragm, said diaphragm and disc valve being connected with the valve actuating part to normally hold the diaphragm seated and the disc valve unseated, and a physically operable part connected with the valve actuating part.

13. In a vacuum brake system for automotive vehicles provided with an internal combustion engine having a throttle controlled suction passage, the combination with a vacuum-balanced power actuator and a pressure-balanced power actuator, of a single controlling valve mechanism for both actuators, comprising a valve casing having a valve chamber connected with one end of the vacuum-balanced actuator, and ports communicating with the said suction passage and with the atmosphere, a valve actuating part extending through the valve casing, a normally opened suction valve for said suction port and a normally closed air inlet valve for said inlet port, said valve casing being provided with a second valve chamber, a diaphragm dividing said chamber and provided with air inlet apertures, said second valve chamber having an annular valve seat for engaging said diaphragm and being connected on one side of said seat with the pressure-balanced actuator and on the other side of said seat with said suction passage, a disc valve for closing the air inlet apertures in the diaphragm, said diaphragm and disc valve being connected with the valve actuating part to normally hold the diaphragm seated and the disc valve unseated, said second valve chamber having a portion on the opposite side of said diaphragm from its annular seat provided with air inlet apertures and communicating with the air inlet port of said first mentioned valve casing, and an operator operated part connected with the valve actuating part.

CALEB S. BRAGG.
VICTOR W. KLIESRATH.